United States Patent
Dudar (10) Patent No.: US 10,215,116 B2
(45) Date of Patent: Feb. 26, 2019

(54) SYSTEM AND METHOD FOR OPERATING AN ENGINE THAT INCLUDES A FUEL VAPOR CANISTER

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/611,271

(22) Filed: Jun. 1, 2017

(65) Prior Publication Data

US 2018/0347485 A1 Dec. 6, 2018

(51) Int. Cl.
| | | |
|---|---|---|
| F02D 41/00 | (2006.01) | |
| F02D 41/12 | (2006.01) | |
| F02D 41/04 | (2006.01) | |
| F02M 25/08 | (2006.01) | |
| F02D 13/06 | (2006.01) | |
| F02P 5/04 | (2006.01) | |
| F02D 13/02 | (2006.01) | |

(52) U.S. Cl.
CPC ..... *F02D 41/0087* (2013.01); *F02D 13/0203* (2013.01); *F02D 13/06* (2013.01); *F02D 41/003* (2013.01); *F02D 41/042* (2013.01); *F02D 41/123* (2013.01); *F02M 25/0854* (2013.01); *F02P 5/045* (2013.01); *F02D 2200/101* (2013.01); *F02D 2200/501* (2013.01); *F02D 2200/60* (2013.01)

(58) Field of Classification Search
CPC ..... F02D 41/0087; F02D 41/003; F02D 13/06
See application file for complete search history.

(56) References Cited

U.S. PATENT DOCUMENTS

| | | | |
|---|---|---|---|
| 7,930,087 B2 | 4/2011 | Gibson et al. | |
| 8,919,097 B2 | 12/2014 | Kerns et al. | |
| 9,080,523 B1* | 7/2015 | Ulrey | F02D 13/0242 |
| 9,709,007 B2* | 7/2017 | Dudar | F02M 25/0854 |
| 2007/0234984 A1* | 10/2007 | Kolmanovsky | F01L 9/04 |
| | | | 123/90.15 |
| 2007/0234985 A1* | 10/2007 | Kolmanovsky | F01L 9/04 |
| | | | 123/90.15 |
| 2009/0070005 A1* | 3/2009 | Kim | F02D 41/0042 |
| | | | 701/103 |
| 2012/0016566 A1* | 1/2012 | Cunningham | F02D 37/02 |
| | | | 701/103 |
| 2014/0318514 A1* | 10/2014 | Pursifull | F01M 13/022 |
| | | | 123/568.29 |
| 2015/0120108 A1* | 4/2015 | Dudar | F02M 25/089 |
| | | | 701/22 |

FOREIGN PATENT DOCUMENTS

EP      1178201 A2    2/2002

* cited by examiner

*Primary Examiner* — Hieui T Vo
*Assistant Examiner* — Arnold Castro
(74) *Attorney, Agent, or Firm* — Julia Voutyras; McCoy Russell LLP (57) ABSTRACT

Systems and methods for operating an engine that includes a canister for storing fuel vapors are disclosed. In one example, one or more engine cylinders are deactivated in response to a level of fuel vapors stored in a fuel vapor storage canister when deceleration fuel shut off conditions are met. By deactivating one or more engine cylinders with closed intake and exhaust valves, it may be possible to reduce fuel vapors drawn into engine cylinders to reduce the possibility of cylinder misfire.

20 Claims, 6 Drawing Sheets

SYSTEM AND METHOD FOR OPERATING AN ENGINE THAT INCLUDES A FUEL VAPOR CANISTER

BACKGROUND AND SUMMARY

An internal combustion engine may be supplied fuel from a fuel tank. The fuel tank may contain fuel vapors that increase pressure in the fuel tank above atmospheric pressure. Pressure in the fuel tank may be a motive force for driving fuel vapors from the fuel tank to a fuel vapor storage canister. One side of the fuel vapor storage canister may be vented to atmosphere so that fuel vapors flow into the fuel vapor storage canister. Once fuel vapors enter the fuel vapor storage canister they may be adsorbed in activated carbon. The activated carbon strips fuel from the gaseous mixture entering the fuel vapor storage canister and allows air to be released to atmosphere, thereby reducing pressure in the fuel tank and the fuel vapor storage canister. A canister purge valve located along a line or conduit leading from the fuel vapor canister to the engine intake manifold may be opened from time to time to purge fuel vapors from the fuel vapor storage canister. A lower pressure in the engine intake manifold may draw air from atmosphere through the fuel vapor canister where it combines with the stored fuel vapors before entering the engine. The concentration of fuel within the air-fuel mixture drawn from the fuel vapor storage canister may range from mostly air to mostly fuel. If the concentration of fuel in vapors drawn to the engine is high, engine cylinders may be exposed to fuel amounts that may be sufficient to cause misfire within the engine cylinders.

The internal combustion engine may also enter a mode referred to as deceleration fuel shut off (DFSO) or deceleration fuel cut out during lower driver demand torque conditions. During DFSO, fuel supplied to engine cylinders ceases while the engine continues to rotate via the vehicle's kinetic energy that is delivered to the engine through the vehicle's wheels and powertrain. By ceasing fuel delivery to the engine during periods of low driver demand, engine fuel consumption may be reduced. However, if fuel vapors are drawn into engine cylinders from the fuel vapor canister when the canister purge valve is closed due to low engine intake manifold pressure, engine cylinders may misfire when the engine cylinders are reactivated. Therefore, it may be desirable to provide a way of reducing the possibility of engine misfire when engine cylinders are reactivated after an engine exits DFSO.

The inventor herein has recognized that engine misfire during cylinder reactivation is undesirable and has developed an engine operating method, comprising: holding intake and exhaust valves of a cylinder closed over one or more engine cycles via a controller in response to deceleration fuel shut off conditions being present and an amount of fuel vapor stored in a canister being greater than a threshold.

By closing and holding closed intake and exhaust valves of a cylinder when deceleration fuel shut off conditions are present, it may be possible to provide the technical result of reducing the possibility of cylinder misfire when cylinders resume combusting air and fuel after exiting DFSO. In one example, air may be trapped in engine cylinders as the engine enters DFSO so that the cylinders may be restarted without excess fueling due to fuel vapors entering cylinders during DFSO. In this way, at least one cylinder of an engine may be reactivated after exiting DFSO with a higher degree of confidence.

The present description may provide several advantages. In particular, the approach may provide improved engine reactivation after the engine enters DFSO. Further, the approach may reduce engine air flow to a catalyst in the engine's exhaust system when the engine is in DFSO so that less fuel may be injected to engine cylinders to balance catalyst oxidants and reductants. Additionally, the approach may lower intake manifold vacuum during DFSO so that the possibility of drawing fuel vapors into the engine from the fuel vapor storage canister during DFSO may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
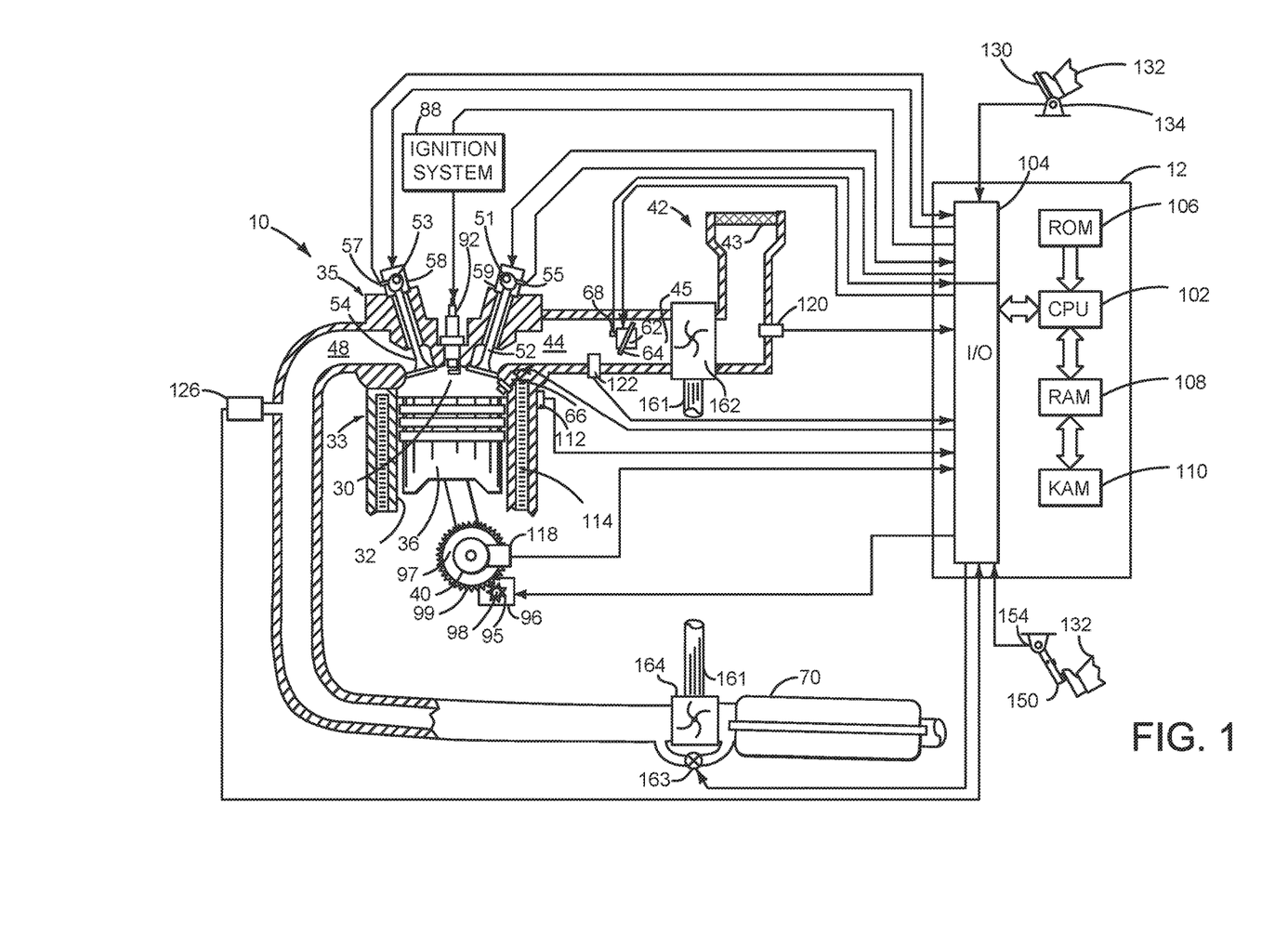
FIG. 1 shows a schematic diagram of one cylinder of an example engine system.
Figure 2:
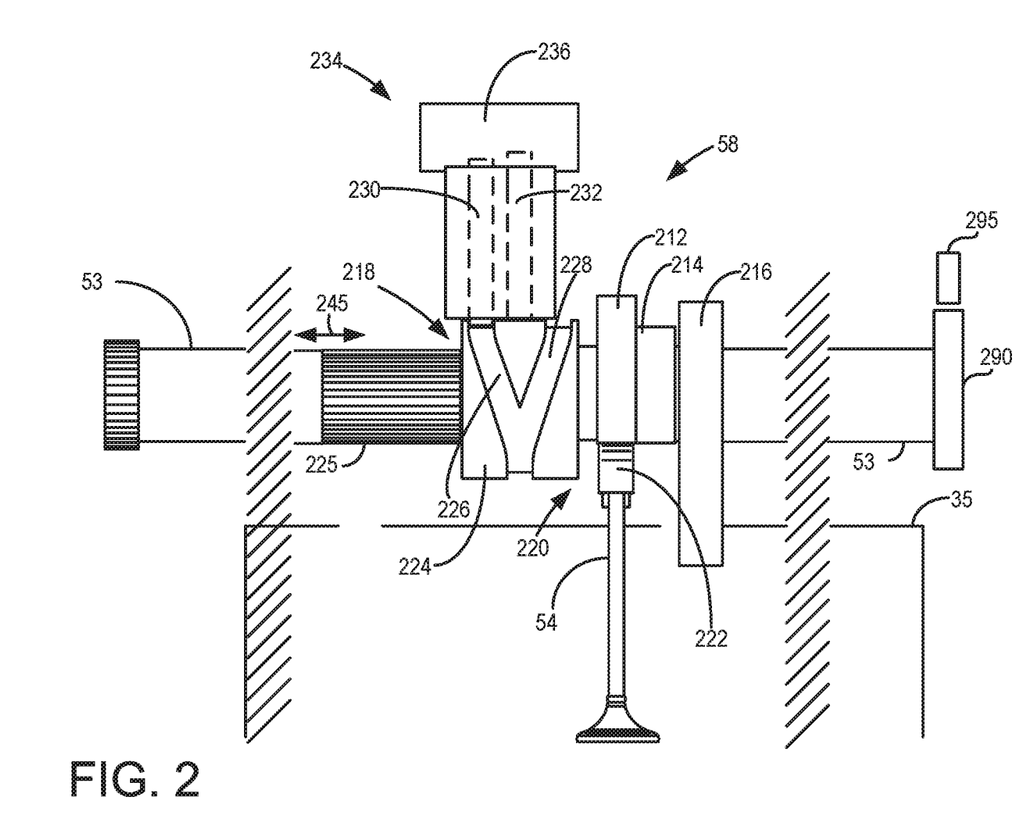
FIG. 2 shows an example cylinder valve activating/deactivating device.
Figure 3:
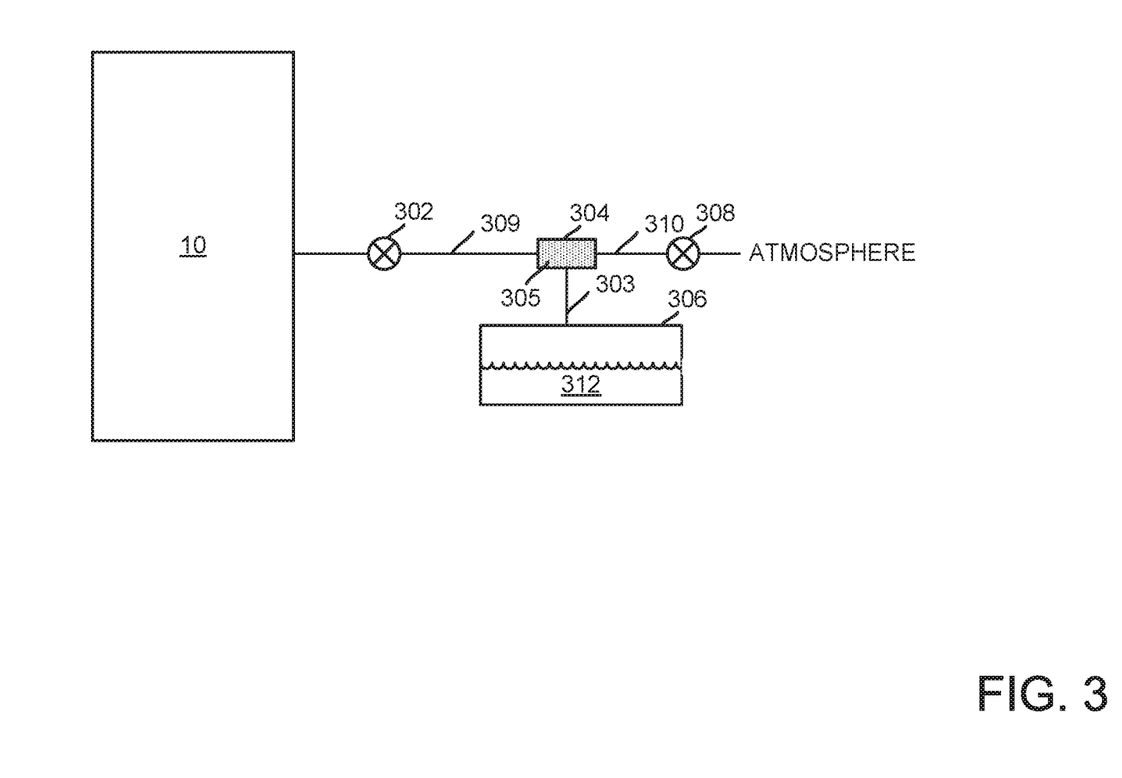
FIG. 3 shows an example fuel vapor management system.
Figure 4A:
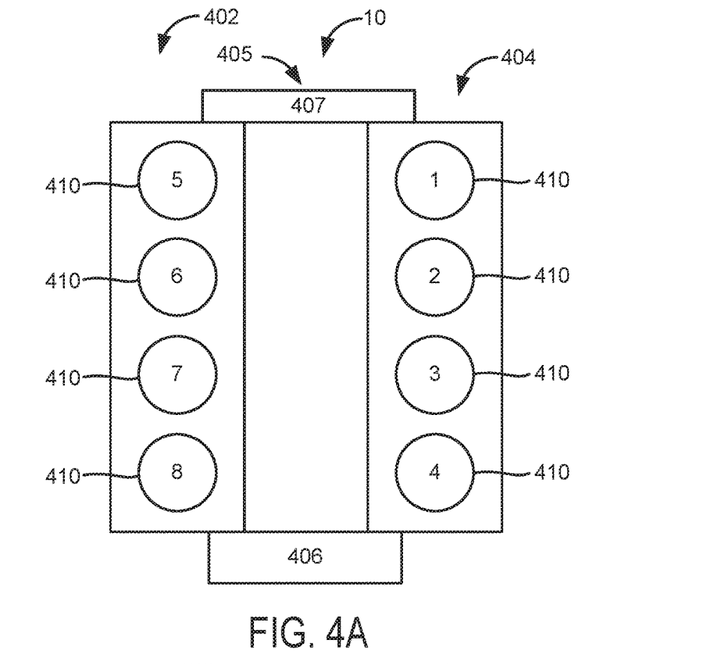
FIGS. 4A and 4B show example cylinder configurations.
Figure 4B:
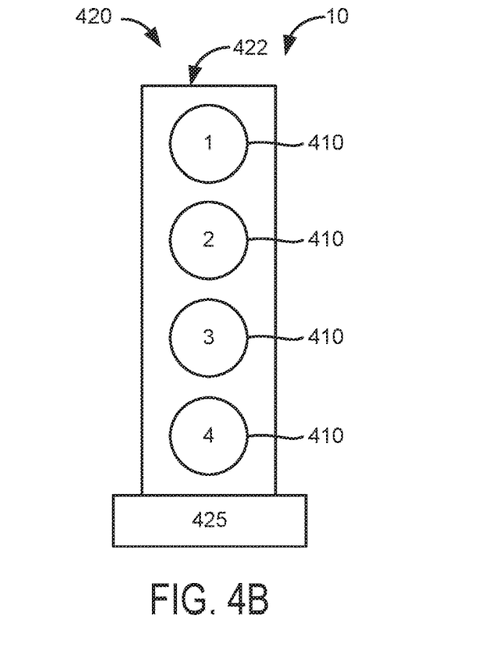
Figure 5:
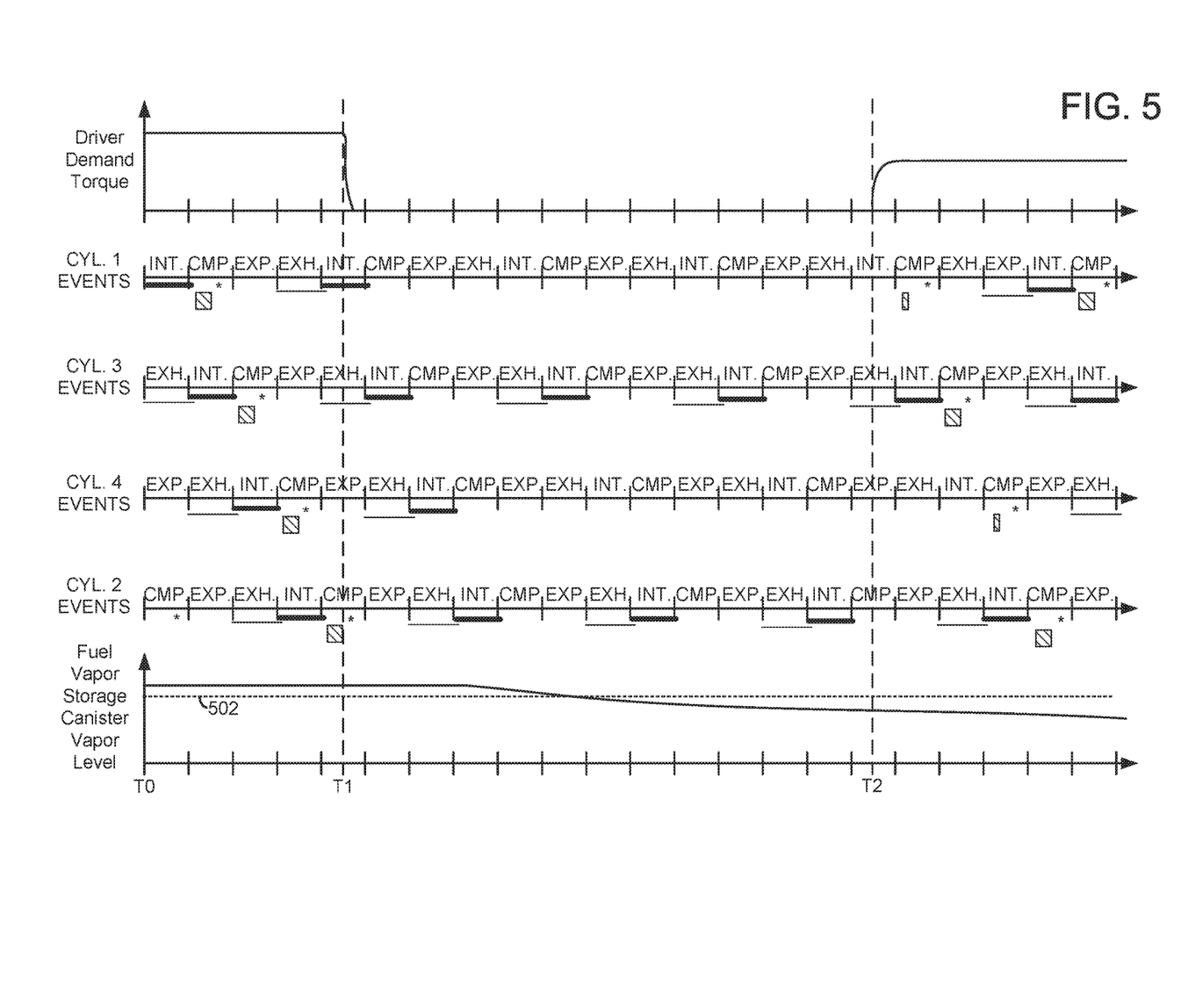
FIG. 5 shows an example DFSO sequence.

The present description is related to operating an engine in a vehicle that includes a fuel vapor storage canister for storing vapors from a fuel tank. An example engine that may combust fuel vapors from a fuel vapor storage canister is shown in FIG. 1. An example actuating mechanism for activating and deactivating cylinder valves is shown in FIG. 2. A fuel vapor control system that includes the engine of FIG. 1 is shown in FIG. 3. Example engine cylinder configurations are shown in FIGS. 4A and 4B, and a sequence for entering and exiting DFSO is shown in FIG. 5. The method of FIG. 6 describes ways to enter and exit DFSO to reduce the possibility of engine misfire that may be related to fuel stored in a fuel vapor storage canister.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve actuator device 59. Exhaust valve 54 may be selectively activated and deactivated by valve actuator device 58. Valve actuator devices 58 and 59 may be as shown in FIG. 2 or other known configurations.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Waste gate 163 may be adjusted via controller 12 to allow exhaust gases to selectively bypass turbine 164 to control the speed of compressor 162. Air filter 43 cleans air entering engine air intake 42. Throttle 62 is positioned downstream of compressor 162 in the direction of air flow into engine 10.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human foot 132; a position sensor 154 coupled to brake pedal 150 for sensing force applied by human foot 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., mass air flow sensor); and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 shows an example cylinder valve actuator 58 for application in engine 10 shown in FIG. 1. Cylinder valve actuator 58 adjusts a lift and/or valve opening duration of a cylinder exhaust valve 54 in response to engine operating conditions. Cylinder valve actuator 58 may provide zero valve lift for one or more engine cycles to deactivate cylinder exhaust valves 54. Exhaust camshaft 53 is shown positioned above a cylinder head 35 of an engine cylinder bank. Exhaust valve 54 is configured to open and close an exhaust port in a cylinder, such as the cylinder shown in FIG. 1. For example, exhaust valve 54 may be actuatable between an open position allowing gas exchange into or out of a cylinder and a closed position substantially blocking gas exchange into or out of the cylinder. It should be understood that though only one valve is shown in FIG. 2; however, engine 10 shown in FIG. 1 may include any number of cylinder valves. Further, a cylinder valve actuator similar to cylinder valve actuator 58 may be applied to engine intake valves. In addition, engine 10 of FIG. 1 may include any number of cylinders with associated valves and a variety of different cylinder and valve configurations may be used, e.g., V-6, I-4, I-6, V-12, opposed 4, and other engine types.

One or more cam towers or camshaft mounting regions may be coupled to cylinder head 35 to support exhaust camshaft 53. For example, cam tower 216 is shown coupled to cylinder head 35 adjacent to exhaust valve 54. Though FIG. 2 shows a cam tower coupled to the cylinder head, in other examples, the cam towers may be coupled to other components of an engine, e.g., to a camshaft carrier or the cam cover. The cam towers may support overhead camshafts and may separate the lift mechanisms positioned on the camshafts above each cylinder.

Exhaust valve 54 may operate in a plurality of lift and duration modes, e.g., a high valve lift, low or partial valve lift, short opening duration, long opening duration, and zero valve lift. For example, as described in more detail below, by adjusting cylinder cam mechanisms, the valves on one or more cylinders, e.g., exhaust valve 54, may be operated in different lift modes based on engine operating conditions.

Exhaust camshaft 53 may include a plurality of cams configured to control the opening and closing of the exhaust valves. For example, FIG. 2 shows a first cam lobe 212 and a second cam lobe 214 positioned above valve 54. The cams lobes may have different shapes and sizes to form lift profiles used to adjust an amount and timing of a lifting of valve 54 while exhaust camshaft 53 rotates. For example, exhaust cam 212 may be a full lift cam lobe and cam 214 may be a zero lift cam lobe. Though, FIG. 2 shows two lift profiles associated with first cam 212 and second cam 214, it should be understood that any number of lift profile cams may be present, e.g., three different cam lobes.

Exhaust camshaft 53 includes a mechanism 218 coupled to the camshaft above the exhaust valve 54 for adjusting an amount of valve lift for that exhaust valve 54 and/or for deactivating that exhaust valve by changing a location of cam lobes along the camshaft relative to exhaust valve 54. For example, the cam lobes 212 and 214 may be slideably attached to the camshaft so that they can slide along the camshaft in an axial direction on a per-cylinder basis. For example, a plurality of cam lobes, e.g., cam lobes 212 and 214, positioned above each cylinder valve, e.g., exhaust valve 54, may be slid across the camshaft in directions indicated by arrow 245 to change a cam lobe profile coupled to the valve follower, e.g., follower 220 coupled to exhaust valve 54, to change the exhaust valve opening and closing durations and lift amounts. The valve cam follower 220 may include a roller finger follower (RFF) 222 which engages with a cam lobe positioned above valve 202. For example, in FIG. 2, roller 222 is shown engaging with full lift cam lobe 212.

Additional follower elements not shown in FIG. 2 may further include push rods, rocker arms, tappets, etc. Such devices and features may control actuation of the intake valves and the exhaust valves by converting rotational motion of the cams into translational motion of the valves. In other examples, the valves can be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders may each have only one exhaust valve and/or intake valve, or more than one intake and/or exhaust valves. In still other examples, exhaust valves and intake valves may be actuated by a common camshaft. However, in an alternate example, at least one of the intake valves and/or exhaust valves may be actuated by its own independent camshaft or other device.

An outer sleeve 224 may be coupled to the cam lobes 212 and 214 splined to exhaust camshaft 53. Camshaft position relative to the engine crankshaft is determined via rotation sensing camshaft position sensor 295 and exhaust camshaft position indicator 290. Exhaust camshaft 53 may be coupled with a cam phaser that is used to vary the valve timing with respect to crankshaft position. By engaging a pin, e.g., one of the pins 230 or 232, into a grooved hub in the outer sleeve, the axial position of the sleeve can be repositioned to that a different cam lobe engages the cam follower coupled to exhaust valve 54 in order to change the lift of the exhaust valve 54. For example, sleeve 224 may include one or more displacing grooves, e.g., grooves 226 and 228, which extend around an outer circumference of the sleeve. The displacing grooves may have a helical configuration around the outer sleeve and, in some examples, may form a Y-shaped or V-shaped groove in the outer sleeve, where the Y-shaped or V-shaped groove is configured to engage two different actuator pins, e.g., first pin 230 and second pin 232, at different times in order to move the outer sleeve to change a lift profile for exhaust valve 54. Sleeve 224 is shown in a first position while pin 232 shifts sleeve 224 to the left side of FIG. 2. Sleeve 224 follows spline 225 in an axial direction along exhaust camshaft 53 when profiles are being switched. Further, a depth of each groove in sleeve 224 may decrease along a length of the groove so that after a pin is deployed into the groove from a home position, the pin is returned to the home position by the decreasing depth of the groove as the sleeve and camshaft rotate.

For example, as shown in FIG. 2, when first pin 230 is deployed into groove 226, outer sleeve 224 will shift in a direction toward cam tower 216 while exhaust camshaft 53 rotates thus positioning cam lobe 212 above valve 202 and changing the lift profile. In order to switch back to cam lobe 214, second pin 232 may be deployed into groove 228 which will shift outer sleeve 224 away from cam tower 216 to position cam lobe 214 above valve 202. In some examples, multiple outer sleeves containing lobes may be splined to exhaust camshaft 53. For example, outer sleeves may be coupled to cam lobes above every valve in engine 10 or a select number of lobes above the valves.

Actuator pins 230 and 232 are included in a cam lobe switching actuator 234 which adjusts the positions of the pins 230 and 232 in order to switch cam lobes positioned above a valve 202. Exhaust cam lobe switching actuator 234 includes an activating mechanism 236, which may be hydraulically powered, or electrically actuated, or combinations thereof. Activating mechanism 236 changes positions of the pins in order to change lift profiles of a valve. For example, activating mechanism 236 may be a coil coupled to both pins 230 and 232 so that when the coil is energized, e.g., via a current supplied thereto from the control system, a force is applied to both pins to deploy both pins toward the sleeve.

Referring now to FIG. 3, an example fuel vapor management system is shown. The fuel management system of FIG. 3 includes engine 10 of FIG. 1 as well as fuel tank 306, fuel vapor storage canister 304, canister purge valve 302, and canister vent valve 308. Fuel 312 may be gasoline, alcohol, or a combination of gasoline and alcohol and it is stored in fuel tank 306.

Fuel 312 may generate fuel vapors when Fuel 312 is agitated or exposed to higher temperatures. The fuel vapors may cause pressure to increase in fuel tank 306 when canister vent valve 302 and canister purge value 308 are closed. The pressure in fuel tank 306 may be relieved by opening canister vent valve 308 so that fuel vapors may travel through conduit 303 to fuel vapor storage canister 304. Activated carbon 305 stored fuel vapors and allows air to pass from fuel vapor storage canister 304 to atmosphere via conduit 310 and canister purge valve 308. Fuel vapors stored in fuel vapor storage canister 304 may be drawn to engine 10 via opening canister vent valve 308 and opening canister purge valve 302. Air may be drawn over activated carbon 305 via vacuum produced in the intake manifold of engine 10 to liberate fuel vapors from fuel vapor storage canister 304. The hydrocarbon concentration of fuel vapors drawn into engine 10 may vary depending on the loading of fuel vapor storage canister 304. For example, if fuel vapor storage canister 304 is storing a large amount of fuel vapor, the concentration of fuel vapor drawn into engine 10 when canister purge valve 302 is open may be high. On the other hand, if fuel vapor storage canister 304 is storing a small amount of fuel vapor, the concentration of fuel vapor drawn into engine 10 when canister purge valve 302 is open may be low.

In this way, fuel vapors from fuel tank 306 may be temporarily stored in fuel vapor storage canister 304. The stored fuel vapors may be subsequently combusted by engine 10 so that fuel vapors do not reach the atmosphere.

Referring now to FIG. 4A, a first configuration of engine 10 is shown. Engine 10 includes two cylinder banks 402 and 404. First cylinder bank 404 includes cylinders 410 numbered 1-4. Second cylinder bank 402 includes cylinders 410 numbered 5-8. Thus, the first configuration is a V8 engine comprising two cylinder banks. All cylinders operating may be a first cylinder operating mode. Front 405 of engine 10 includes an accessory drive 407, which may include pumps, fans, etc. Transmission 406 is shown coupled to a rear side of engine 10.

During select conditions, one or more of cylinders 410 may be deactivated via ceasing to flow fuel to the deactivated cylinders. Further, air flow to deactivated cylinders may cease via closing and holding closed intake and exhaust valves of the deactivated cylinders, thereby deactivating the intake and exhaust valves. The engine cylinders may be deactivated in a variety of patterns to provide a desired actual total number of activated or deactivated cylinders. For example, cylinders 2, 3, 5, and 8 may be deactivated forming a first pattern of deactivated cylinders and a second cylinder operating mode. Alternatively, cylinders 1, 4, 6, and 7 may be deactivated forming a second pattern of deactivated cylinders and a third cylinder operating mode. In still another example, cylinders 2 and 8 may be deactivated forming a third pattern of deactivated cylinders and a fourth cylinder operating mode. In yet another example, cylinders 3 and 5 may be deactivated forming a fourth pattern of deactivated cylinders and a fifth cylinder operating mode. In this example, five cylinder operating modes are provided; however, additional or fewer cylinder operating modes may be provided. If engine conditions are such that the engine may operate in any of the five cylinder modes described, the engine may be described as having five available cylinder operating modes. In this example, if two of the engine's five operating modes are not available, the engine may be described as having three available operating modes. The engine always has one available cylinder operating mode (e.g., all cylinders active and combusting air and fuel). Of course, the actual total number of available operating modes may be more than or less than five depending on the engine configuration.

Referring now to FIG. 4B, a second configuration of engine 10 is shown. Engine 10 includes one cylinder bank 422. Cylinder bank 406 includes cylinders 410 numbered 1-4. Thus, the first configuration is an I4 engine comprising one cylinder bank. All cylinders operating may be a first cylinder operating mode for this engine configuration. Cylinder number one is nearest to front of engine 420.

Similar to the first configuration, one or more of cylinders 410 may be deactivated via ceasing to flow fuel to the deactivated cylinders. Further, air flow to deactivated cylinders may cease via closing and holding closed intake and exhaust valves of the deactivated cylinders. The engine cylinders may be deactivated in a variety of patterns to provide a desired actual total number of activated or deactivated cylinders. For example, cylinders 2 and 3 may be deactivated forming a first pattern of deactivated cylinders and a second cylinder operating mode. Alternatively, cylinders 1 and 4 may be deactivated forming a second pattern of deactivated cylinders and a third cylinder operating mode. In still another example, cylinder 2 may be deactivated forming a third pattern of deactivated cylinders and a fourth cylinder operating mode. In yet another example, cylinder 3 may be deactivated forming a fourth pattern of deactivated cylinders and a fifth cylinder operating mode. In this example, if engine conditions are such that the engine may operate in any of the five cylinder modes described, the engine may be described as having five available cylinder operating modes. If two of the engine's five operating modes are not available, the engine may be described as having three available operating modes. The engine always has one available cylinder operating mode (e.g., all cylinders active and combusting air and fuel). Of course, the actual total number of available operating modes may be more than or less than five depending on the engine configuration.

In still other examples, different cylinder configurations may be provided. For example, the engine may be a V6 engine or a V10 engine. The different engine configurations may also have different numbers of cylinder operating modes.

Thus, the system of FIGS. 1-4B provides for an engine system, comprising: an engine including a cylinder having intake valves, exhaust valves, and one or more cylinder valve deactivating mechanisms; a fuel vapor storage canister; and a controller including executable instructions stored in non-transitory memory to hold the intake valves and the exhaust valves closed via the one or more cylinder valve deactivating mechanisms over one or more engine cycles in response to deceleration fuel shut off conditions being present and an amount of fuel vapor stored in the canister being greater than a threshold, and additional instructions to open and close the intake valves and the exhaust valves in response to deceleration fuel shut off conditions being present. The engine system further comprises additional instructions to cease fuel delivery to the cylinder in response to deceleration fuel shut off conditions being present. The engine system includes where deceleration fuel shut off conditions include driver demand torque less than a threshold and vehicle speed greater than a threshold. The engine system further comprises additional instructions to cease spark delivery to the cylinder in response to deceleration fuel shut off conditions being present. The engine system further comprises additional instructions to open the intake and exhaust valves after holding the intake and exhaust valves of the cylinder closed over the one or more engine cycles in response to an increase in driver demand torque. The engine system further comprises additional instructions to supply fuel to the cylinder after opening the intake and exhaust valves.

Referring now to FIG. 5, an example engine operating sequence for a four cylinder four stroke engine is shown. The operating sequence of FIG. 5 may be produced via the system of FIGS. 1-4B executing instructions of the method described in FIG. 6. Each plot shown in FIG. 5 occurs at the same time as the other plots in FIG. 5, and vertical markers T0-T9 indicate times of particular interest during the sequence. FIG. 5 is a prophetic example of an engine entering and exiting a DFSO mode. Vertical markers T0-T2 represent times of particular interest during the sequence. The engine has a firing order of 1-3-4-2.

The first plot from the top of FIG. 5 is a plot of driver demand torque verses engine position. The horizontal axis represents engine position and engine position may be determined via the positions of cylinders 1-4 shown in the $2^{nd}$ through $5^{th}$ plots of FIG. 5. The vertical markers along the horizontal axis represent top dead center or bottom dead center positions of different engine cylinders. The vertical axis represents driver demand torque and driver demand torque increases in the direction of the vertical axis arrow. Driver demand torque may be determined from accelerator pedal position and vehicle speed. In one example, accelerator pedal position and vehicle speed reference a table or function of empirically determined values of driver demand torque. The table or function outputs a driver demand torque.

The second plot from the top of FIG. 5 is a plot of strokes for cylinder number one. Cylinder number one is on the stroke identified in the second plot as the engine rotates through strokes from the left hand side of FIG. 5 to the right hand side of FIG. 5. The strokes change according to strokes of a four stroke engine. INT. is the abbreviation for intake stroke, CMP. is the abbreviation for compression stroke, EXP. is the abbreviation for expansion stroke, and EXH. is the abbreviation for exhaust stroke. Intake valve opening time for the intake valves of cylinder number one is indicated by the heavy horizontal lines below the stroke labels for cylinder number one. Exhaust valve opening time for the exhaust valves of cylinder number one is indicated by the lighter horizontal lines below the stroke labels for cylinder number one. Spark timing for cylinder number one is indicated by the * below the stroke labels. Fuel injection timing is indicated by the slashed bars below the stroke labels for cylinder number one. The vertical bars separate the different cylinder strokes and indicate the cylinder's piston is at bottom dead center or top dead center. For example, the vertical bar between intake stroke and compression stroke is bottom dead center intake or compression stroke.

The third plot from the top of FIG. 5 is a plot of strokes for cylinder number three. Cylinder number three is on the stroke identified in the third plot as the engine rotates through strokes from the left hand side of FIG. 5 to the right hand side of FIG. 5. Intake valve opening time for the intake valves of cylinder number three is indicated by the heavy horizontal lines below the stroke labels for cylinder number three. Exhaust valve opening time for the exhaust valves of cylinder number one is indicated by the lighter horizontal lines below the stroke labels for cylinder number three. Spark timing for cylinder number three is indicated by the * below the stroke labels for cylinder number three. Fuel injection timing is indicated by the slashed bars below the stroke labels. The vertical bars separate the different cylinder strokes and indicate the cylinder's piston is at bottom dead center or top dead center.

The fourth plot from the top of FIG. 5 is a plot of strokes for cylinder number four. Cylinder number four is on the stroke identified in the fourth plot as the engine rotates through strokes from the left hand side of FIG. 5 to the right hand side of FIG. 5. Intake valve opening time for the intake valves of cylinder number four is indicated by the heavy horizontal lines below the stroke labels for cylinder number four. Exhaust valve opening time for the exhaust valves of cylinder number one is indicated by the lighter horizontal lines below the stroke labels for cylinder number four. Spark timing for cylinder number four is indicated by the * below the stroke labels for cylinder number four. Fuel injection timing is indicated by the slashed bars below the stroke labels. The vertical bars separate the different cylinder strokes and indicate the cylinder's piston is at bottom dead center or top dead center.

The fifth plot from the top of FIG. 5 is a plot of strokes for cylinder number two. Cylinder number two is on the stroke identified in the fifth plot as the engine rotates through strokes from the left hand side of FIG. 5 to the right hand side of FIG. 5. Intake valve opening time for the intake valves of cylinder number two is indicated by the heavy lines below the stroke labels for cylinder number two. Exhaust valve opening time for the exhaust valves of cylinder number one is indicated by the lighter horizontal lines below the stroke labels for cylinder number two. Spark timing for cylinder number two is indicated by the * below the stroke labels for cylinder number two. Fuel injection timing is indicated by the slashed bars below the stroke labels. The vertical bars separate the different cylinder strokes and indicate the cylinder's piston is at bottom dead center or top dead center.

The sixth plot from the top of FIG. 5 is a plot of fuel vapor storage canister fuel vapor level verses engine position. The horizontal axis represents engine position and engine position may be determined via the positions of cylinders 1-4 shown in the $2^{nd}$ through $5^{th}$ plots of FIG. 5. The vertical markers along the horizontal axis represent top dead center or bottom dead center positions of different engine cylinders. The vertical axis represents fuel vapor storage canister fuel vapor level and the fuel vapor storage canister fuel vapor level increases in the direction of the vertical axis arrow. It should be noted that the time between cylinder strokes may vary as engine speed increases and decreases; however, the number of engine degrees between strokes is constant and fixed. Horizontal line 502 represents a threshold fuel vapor storage canister fuel vapor level threshold. One or more valves of engine cylinders may be held closed over one or more engine cycles in response to entering DFSO and fuel vapors stored in the fuel vapor storage canister exceeding threshold 502.

At T0, the engine is rotating and combusting an air fuel mixture while the driver demand torque is at a middle level. The fuel vapor storage canister vapor level is at a level greater than threshold 502. Each of the engine's cylinders is combusting air and fuel.

At time T1, the driver demand torque is reduced in response to a human driver releasing an accelerator pedal or an autonomous driver reducing a torque request (not shown). Further, the vehicle speed (not shown) is greater than a threshold speed so conditions are present for entering deceleration fuel shut off. Since the level of fuel vapor is greater than threshold 502 and since DFSO conditions are present, intake and exhaust valves of cylinders number on and four are commanded closed and held closed. The intake and exhaust valves of cylinder numbered two and three are allowed to continue to open and close. However, in other examples, the intake and exhaust valves of all engine cylinders may be commanded closed and held closed in response to DFSO conditions and the vapor storage level exceeding threshold 502. The engine throttle (not shown) and the canister purge valve are also closed at time T1 in response to the reduction in driver demand torque.

Between T1 and T2 the engine continues to rotate and the driver demand remains low. Just after the driver demand torque is reduced a last combustion event in cylinder number two occurs as indicated by the *. Cylinder number one is in the middle of an intake stroke, so fuel is not delivered to cylinder number one, but air that is inducted to cylinder one is trapped in cylinder number one by closing and holding closed the intake and exhaust valves of cylinder number one. The intake and exhaust valves of cylinder number three and cylinder number two continue to open and close. The exhaust valves and intake valves of cylinder number four are opened one time after time T1 and before time T2 to expel exhaust from cylinder number four and trap fresh air in cylinder number four. Thus, fresh air is trapped in cylinder number one and cylinder number four as the engine rotates. The engine throttle remains closed (not shown) so engine intake manifold vacuum increases (not shown) causing fuel vapors to migrate from the fuel vapor canister to the engine intake manifold. The migration of fuel vapors from the fuel vapor storage canister is indicated by the fuel vapor storage level being reduced even though the canister purge valve is closed.

At time T2, the driver demand torque increases in response to a human driver applying the accelerator pedal or an autonomous driver increasing demand torque (not shown). Cylinder number one is completing its intake stroke, without the intake valves opening, and so fuel is injected to cylinder number one shortly after the driver demand torque increase. Fuel is injected to cylinder number one to mix with fresh air that is trapped in the cylinder and subsequently combusted. The amount of air trapped in cylinder number one may be reduced depending on the duration that the intake and exhaust valves of cylinder number one are closed. The air may be reduced by air slipping past cylinder rings and into the engine crankcase. The amount of fuel injected to reactivate combustion in cylinder number one may be based on an estimate of trapped air in cylinder number one. Cylinder number one is a first cylinder to combust air and fuel after the most recent deactivation (e.g., ceasing of combustion) of engine cylinders. Because cylinder number one did not induct fuel vapors while engine cylinders were deactivated, combustion in cylinder number one may be more robust and less likely to result in a misfire.

Combustion in cylinder numbers two and three is also reinitiated, but the possibility of misfiring in cylinders two and three may be increased due to fuel vapor migrating from the fuel vapor storage canister to cylinder numbers two and three. The combustion event in cylinder number one may help to accelerate the engine if cylinder numbers two and three misfire.

Fuel is injected to cylinder number four before intake and exhaust valves of cylinder number four begin to open and close after being deactivated shortly after time T1. The fresh air trapped in cylinder number four may be combusted with the fuel injected absent fuel vapors from the fuel vapor canister that migrated to the engine after time T1. Thus, the possibility of misfire for the first combustion event in cylinder number four after cylinder number four was deactivated at time T1 may be reduced. Cylinder number four may further improve engine acceleration so that if misfire occurs in cylinder number two or cylinder number three it may be less noticeable to vehicle occupants.

In this way, an engine may enter DFSO and exit DFSO with a lower possibility of engine misfire in all engine cylinders. As such, the engine may provide torque sooner so that vehicle occupants may not be disturbed.

Figure 6:
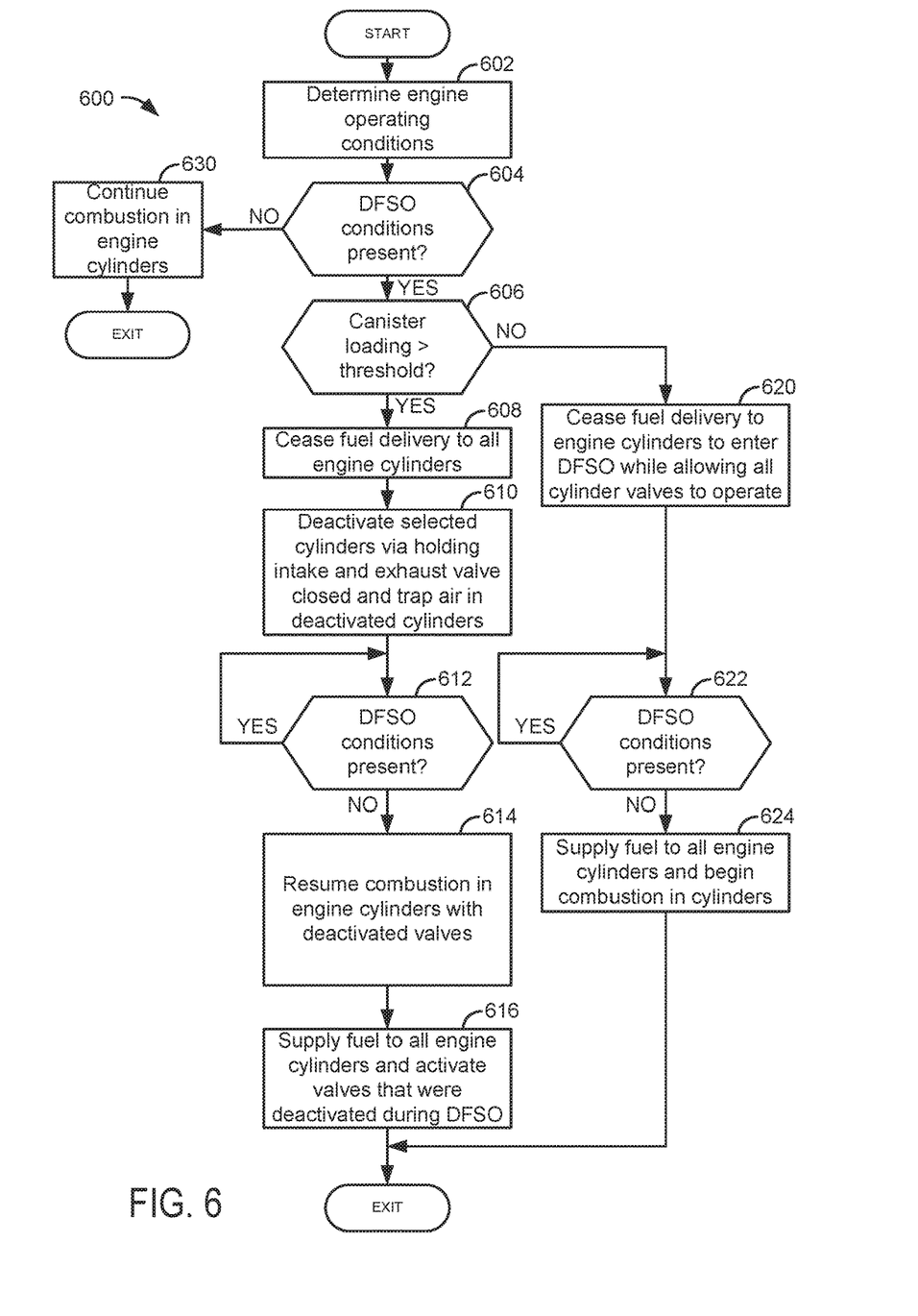
FIG. 6 shows an example method for operating an engine.

Referring now to FIG. 6, a method for operating and engine and reducing the possibility of misfire is shown. The method of FIG. 6 may be incorporated into and may cooperate with the system of FIGS. 1-4B. Further, at least portions of the method of FIG. 6 may be incorporated as executable instructions stored in non-transitory memory while other portions of the method may be performed via a controller transforming operating states of devices and actuators in the physical world.

At 602, method 600 determines vehicle operating conditions. Vehicle operating conditions may include but are not limited to vehicle speed, engine speed, driver demand torque, and fuel vapor storage canister vapor level (e.g., an amount of fuel vapors stored in the fuel vapor storage canister). The various parameters may be determined from the various sensors shown in FIGS. 1-4B. Method 600 proceeds to 604.

At 604, method 600 judges if DFSO conditions are present. In one example, DFSO conditions are present when driver demand torque is less than a threshold and vehicle speed is greater than a threshold. Further, other conditions such as transmission gear and torque converter clutch state may be a basis for determining whether or not DFSO conditions are present. If method 600 judges that DFSO conditions are present, the answer is yes and method 600 proceeds to 606. Otherwise, the answer is no and method 600 proceeds to 630.

At 630, method 600 continues combusting air and fuel in engine cylinders. Method 600 may also deactivate selected cylinders at times while other engine cylinders continue to operate and combust air and fuel. Method 600 proceeds to exit.

At 606, method 600 judges whether or not fuel vapor storage canister fuel vapor loading or level is greater than a threshold. If so, the answer is yes and method 600 proceeds to 608. Otherwise, the answer is no and method 600 proceeds to 620.

At 608, method 600 ceases fuel delivery to engine cylinders. For cylinders where fuel delivery is in progress, the fuel being delivered completes and then ceases. Method 600 proceeds to 610.

At 610, method 600 deactivates air flow through selected engine cylinders. Intake and exhaust valves of at least one engine cylinder are closed and held closed to prevent flow though the cylinders. In one example, intake and exhaust valves of half the engine cylinders are closed and held closed while DFSO conditions are present. However, in some examples, intake and exhaust valves of all engine cylinders are closed and held closed. The intake and exhaust valves of cylinders that are closed are closed such that combustion gases are expelled from the cylinders and fresh air is inducted to the cylinders with intake and exhaust valves that are being held closed. FIG. 5 shows an example of closing intake and exhaust valves so that fresh air may be trapped in cylinders with intake and exhaust valves that are held closed over an entire engine cycle (e.g., two engine revolutions for a four stroke engine). By trapping fresh air in the engine cylinders, the engine cylinders may be restarted more reliably so that the possibility of engine misfire may be reduced. In some examples, intake and exhaust valves of some engine cylinders may continue to open and close over an engine cycle while intake and exhaust valves of other cylinders are deactivated. In this way, the number of selectable valve actuators may be reduced. Method 600 proceeds to 612.

At 612, method 600 judges if DFSO conditions are still present. If so, the answer is yes and method 600 returns to 612. Otherwise, the answer is no and method 600 proceeds to 614.

At 614, method 600 resumes combustion in cylinders having intake and exhaust valves that were deactivated when DFSO was entered. Combustion is resumed by injecting fuel to the cylinders with valves that were deactivated and supplying spark to the cylinders. In one example, a cylinder that was deactivated with intake valves and exhaust valves closed is selected to provide a first combustion event since the most recent entry into DFSO. The air-fuel ratio of the cylinder may be slightly rich or stoichiometric to reduce oxygen stored in the catalyst. This allows a cylinder that did not induct fuel vapors during DFSO to be a first cylinder to resume combustion after the most recent DFSO event. Therefore, reliability of reactivating the engine may be improved since the air-fuel mixture in the cylinder will not be too rich. FIG. 5 shows one example of reactivating combustion for a first combustion event in a cylinder that had its intake and exhaust valves held closed during a DFSO event. Method 600 proceeds to 616.

At 616, method 600 begins supplying fuel and spark to all engine cylinders after the DFSO event. Further, intake and exhaust valves of cylinders that were held closed during the DFSO event are reactivated to begin opening and closing. If some engine cylinders did induct fuel vapors from the fuel vapor storage canister during the most recent DFSO event, then the amount of fuel injected to those cylinders may be reduced to further reduce the possibility of engine misfire. For example, fuel injected to engine cylinders with valves that were not deactivated during the most recent DFSO event may be injected to provide a lean limit air-fuel ratio for the engine cylinder (e.g., leanest air-fuel ratio the cylinder may operate at with covariation of indicated mean effective cylinder pressure less than a threshold) in case vapors from the fuel vapor storage canister migrated to the engine cylinders during the most recent DFSO event. If fuel vapors from the fuel vapor storage canister migrated to the cylinder, the air-fuel mixture in the cylinder may be lean enough to support combustion. Method 600 proceeds to exit after reactivating engine cylinders.

At 620, method 600 ceases fuel delivery to all engine cylinders and allows intake and exhaust valves of all engine cylinders to continue opening and closing during each engine cycle. Thus, combustion ceases in all engine cylinders since driver demand torque is low. The engine throttle may also be fully closed and spark delivery to engine cylinders may be ceased. Method 600 proceeds to 622.

At 622, method 600 judges if DFSO conditions are still present. If so, the answer is yes and method 600 returns to 622. Otherwise, the answer is no and method 600 proceeds to 624.

At 624, method 600 supplies fuel and spark to all engine cylinders so as to resume combustion in all engine cylinders. When the fuel vapor storage canister fuel vapor level is low, there may be less possibility of misfire due to rich air-fuel mixtures when engine cylinders are reactivated. Therefore, the engine may be reactivated with a full cylinder charge in each cylinder to improve engine torque production. Method 600 proceeds to exit.

In this way, intake and exhaust valves of selected cylinders may be deactivated and held in closed positions during conditions where excess fuel vapors may be drawn to engine cylinders during DFSO. Air trapped in engine cylinders with deactivated intake and exhaust valves may be mixed with injected fuel to provide an expected air-fuel ratio that may reduce the possibility of engine misfire. However, if a level of fuel vapors stored in the fuel vapor storage canister is low, the engine cylinders may be reactivated in a way that may increase engine output power for a first few combustion events since exiting a most recent DFSO event as compared to reactivating engine cylinders when intake and exhaust valves have been deactivated.

Thus, the method of FIG. 6 provides for an engine operating method, comprising: holding intake and exhaust valves of a cylinder closed over one or more engine cycles via a controller in response to deceleration fuel shut off conditions being present and an amount of fuel vapor stored in a canister being greater than a threshold. The method includes where deceleration fuel shut off conditions include driver demand torque less than a threshold and vehicle speed greater than a threshold. The method further comprises inducting air into the cylinder and trapping the air in the cylinder while holding intake and exhaust valves of the cylinder closed. The method further comprises ceasing fuel delivery to the cylinder while holding intake and exhaust valves of the cylinder closed over the one or more engine cycles. The method further comprises ceasing spark delivery to the cylinder while holding intake and exhaust valves of the cylinder closed over the one or more engine cycles. The method further comprises opening and closing intake and exhaust valves of a second cylinder while holding intake and exhaust valves of the cylinder closed. The method includes where the canister is a fuel vapor storage canister that includes activated carbon.

The method of FIG. 6 also provides for an engine operating method, comprising: holding intake and exhaust valves of a cylinder closed over one or more engine cycles via a controller in response to deceleration fuel shut off conditions being present and an amount of fuel vapor stored in a canister being greater than a threshold; and opening the intake and exhaust valves after holding the intake and exhaust valves of the cylinder closed in response to an increase in driver demand torque. The method further comprises supplying fuel to the cylinder after opening the intake and exhaust valves. The method further comprises ceasing combustion in all cylinders of an engine in response to deceleration fuel shut off conditions being present. The method further comprises combusting air and fuel in all cylinders of the engine in response to the increase in driver demand torque. The method further comprises opening and closing intake and exhaust valves of a second cylinder while holding intake and exhaust valves of the cylinder closed. The method further comprises ceasing to supply spark to all cylinders of an engine in response to deceleration fuel shut off conditions being present. The method further comprises opening the intake and exhaust valves after holding the intake and exhaust valves of the cylinder closed in response to vehicle speed being less than a threshold.

It will be appreciated that the configurations and methods disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
holding intake and exhaust valves of a cylinder closed over one or more engine cycles via a controller in response to deceleration fuel shut off conditions being present and an amount of fuel vapor stored in a canister being greater than a threshold; and
opening and closing intake and exhaust valves of a second cylinder while holding intake and exhaust valves of the cylinder closed.

2. An engine operating method, comprising:
holding intake and exhaust valves of a cylinder closed over one or more engine cycles via a controller in response to deceleration fuel shut off conditions being present and an amount of fuel vapor stored in a canister being greater than a threshold,
where deceleration fuel shut off conditions include driver demand torque less than a threshold and vehicle speed greater than a threshold.

3. The method of claim 2, further comprising inducting air into the cylinder and trapping the air in the cylinder while holding intake and exhaust valves of the cylinder closed.

4. The method of claim 2, further comprising ceasing fuel delivery to the cylinder while holding intake and exhaust valves of the cylinder closed over the one or more engine cycles.

5. The method of claim 2, further comprising ceasing spark delivery to the cylinder while holding intake and exhaust valves of the cylinder closed over the one or more engine cycles.

6. The method of claim 2, further comprising opening and closing intake and exhaust valves of a second cylinder while holding intake and exhaust valves of the cylinder closed.

7. The method of claim 2, where the canister is a fuel vapor storage canister that includes activated carbon.

8. An engine operating method, comprising:
holding intake and exhaust valves of a cylinder closed over one or more engine cycles via a controller in response to deceleration fuel shut off conditions being present and an amount of fuel vapor stored in a canister being greater than a threshold; and
opening the intake and exhaust valves after holding the intake and exhaust valves of the cylinder closed in response to an increase in driver demand torque.

9. The method of claim 8, further comprising supplying fuel to the cylinder after opening the intake and exhaust valves.

10. The method of claim 8, further comprising ceasing combustion in all cylinders of an engine in response to deceleration fuel shut off conditions being present.

11. The method of claim 10, further comprising combusting air and fuel in all cylinders of the engine in response to the increase in driver demand torque.

12. The method of claim 8, further comprising opening and closing intake and exhaust valves of a second cylinder while holding intake and exhaust valves of the cylinder closed.

13. The method of claim 12, further comprising ceasing to supply spark to all cylinders of an engine in response to deceleration fuel shut off conditions being present.

14. The method of claim 8, further comprising opening the intake and exhaust valves after holding the intake and exhaust valves of the cylinder closed in response to vehicle speed being less than a threshold.

15. An engine system, comprising:
an engine including a cylinder having intake valves, exhaust valves, and one or more cylinder valve deactivating mechanisms;
a fuel vapor storage canister; and
a controller including executable instructions stored in non-transitory memory to hold the intake valves and the exhaust valves closed via the one or more cylinder valve deactivating mechanisms over one or more engine cycles in response to deceleration fuel shut off conditions being present and an amount of fuel vapor stored in the canister being greater than a threshold, instructions to open and close the intake valves and the exhaust valves in response to deceleration fuel shut off conditions being present, and instructions to cease spark delivery to the cylinder in response to deceleration fuel shut off conditions being present.

16. The engine system of claim 15, further comprising additional instructions to cease fuel delivery to the cylinder in response to deceleration fuel shut off conditions being present.

17. The engine system of claim 15, where deceleration fuel shut off conditions include driver demand torque less than a threshold and vehicle speed greater than a threshold.

18. The engine system of claim 15, further comprising additional instructions to open the intake and exhaust valves after holding the intake and exhaust valves closed over the one or more engine cycles in response to an increase in driver demand torque.

19. The engine system of claim 18, further comprising additional instructions to supply fuel to the cylinder after opening the intake and exhaust valves.

20. An engine system, comprising:
an engine including a cylinder having intake valves, exhaust valves, and one or more cylinder valve deactivating mechanisms;
a fuel vapor storage canister; and
a controller including executable instructions stored in non-transitory memory to hold the intake valves and the exhaust valves closed via the one or more cylinder valve deactivating mechanisms over one or more engine cycles in response to deceleration fuel shut off conditions being present and an amount of fuel vapor stored in the canister being greater than a threshold, and additional instructions to open and close the intake valves and the exhaust valves in response to deceleration fuel shut off conditions being present,
where deceleration fuel shut off conditions include driver demand torque less than a threshold and vehicle speed greater than a threshold.

* * * * *